(12) United States Patent
Hyde

(10) Patent No.: US 6,219,185 B1
(45) Date of Patent: *Apr. 17, 2001

(54) LARGE APERTURE DIFFRACTIVE SPACE TELESCOPE

(75) Inventor: Roderick A. Hyde, Livermore, CA (US)

(73) Assignee: The United States of America as represented by the United States Department of Energy, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,499

(22) Filed: Apr. 20, 1998

Related U.S. Application Data

(60) Provisional application No. 60/044,686, filed on Apr. 18, 1997.

(51) Int. Cl.$^7$ .......................... G02B 27/44; G02B 23/00; F41G 7/00; F42B 10/00
(52) U.S. Cl. .................. 359/565; 359/566; 359/399; 359/418; 244/3.16; 244/3.17
(58) Field of Search ..................... 359/354, 357, 359/364, 365, 366, 429, 430, 405, 406, 407, 565, 566, 399, 401; 244/3.16, 3.17

(56) References Cited

U.S. PATENT DOCUMENTS

| | | | | |
|---|---|---|---|---|
| 4,131,791 | * | 12/1978 | Lego | 250/199 |
| 4,453,224 | * | 6/1984 | Crooks | 359/565 |
| 5,548,439 | * | 8/1996 | Smith | 359/566 |

\* cited by examiner

*Primary Examiner*—Audrey Chang
(74) *Attorney, Agent, or Firm*—Thomas O'Dwyer; William C. Daubenspeck; Paul A. Gottlieb

(57) ABSTRACT

A large (10's of meters) aperture space telescope including two separate spacecraft—an optical primary objective lens functioning as a magnifying glass and an optical secondary functioning as an eyepiece. The spacecraft are spaced up to several kilometers apart with the eyepiece directly behind the magnifying glass "aiming" at an intended target with their relative orientation determining the optical axis of the telescope and hence the targets being observed. The objective lens includes a very large-aperture, very-thin-membrane, diffractive lens, e.g., a Fresnel lens, which intercepts incoming light over its full aperture and focuses it towards the eyepiece. The eyepiece has a much smaller, meter-scale aperture and is designed to move along the focal surface of the objective lens, gathering up the incoming light and converting it to high quality images. The positions of the two space craft are controlled both to maintain a good optical focus and to point at desired targets which may be either earth bound or celestial.

29 Claims, 7 Drawing Sheets

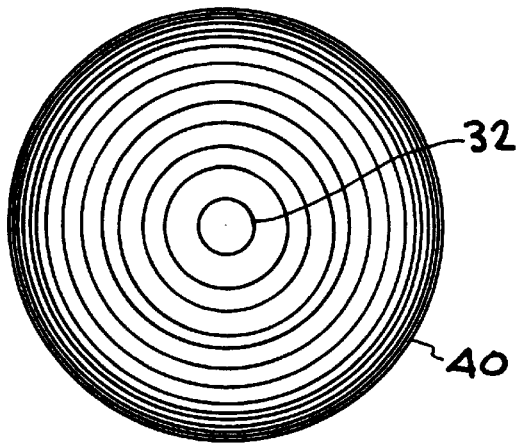
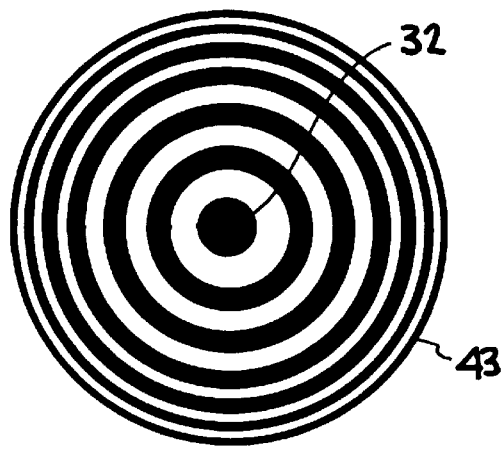
FIG. 2A          FIG. 2B
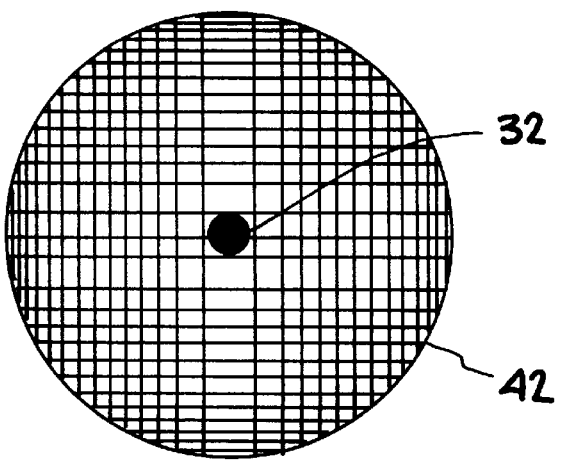
FIG. 3

LARGE APERTURE DIFFRACTIVE SPACE TELESCOPE

CROSS-REFERENCE TO RELATED APPLICATIONS

This application claims the benefit of U.S. Provisional Application Ser. No. 60/044,686, filed Apr. 18, 1997 FOR "EXTREME MAGNIFICATION TELESCOPE" which is hereby incorporated by reference herein.

STATEMENT OF GOVERNMENT INTEREST

The United States Government has rights in this invention pursuant to Contract No. W-7405-ENG-48 between the United States Department of Energy and the University of California.

FIELD OF THE INVENTION

This invention relates in general to earth observation and astronomical observation from satellites and, in particular, to a large aperture diffractive telescope for performing such observations from intermediate or geosynchronous earth orbit. The invention pertains especially to a space-based diffractive telescope having a relatively large aperture objective lens and a separate spaced-apart eyepiece.

BACKGROUND OF THE INVENTION

Present space-based earth observation is generally from satellites in low earth orbit. This low earth orbit observation is usually accomplished with reflective telescopes. Since the position of such a low earth orbit satellite is continually changing with respect to any location on the earth's surface, any area of the earth's surface can only be viewed by the satellite for a brief time as the satellite passes over the particular area of interest on its orbit. Furthermore, if the area of interest on the earth's surface does not come within the field of regard of the satellite within an acceptable period of time, the satellite must have the capability of substantially modifying its orbit to pass over the area of interest if the desired observation is to be obtained.

A telescope in geosynchronous earth orbit, in contrast, can observe any position within its field of regard whenever desired and for as long as necessary. However, geosynchronous earth orbit is 100 times higher than low earth orbit so that to get the same resolution from geosynchronous earth orbit as from low earth orbit, the aperture of the telescope needs to be 100 times greater. Sub-meter earth observation from geosynchronous earth orbit and high resolution astronomy require space telescopes having apertures in the 10's of meters. It is apparent that a space telescope having such a large aperture would be very advantageous.

In the past, considerable effort has been spent attempting to design reflective telescopes of such size, but two basic difficulties have arisen: achieving and maintaining sub-wavelength tolerances over the large apertures, and designing telescopes which are light and compactly packaged for launch and eventual deployment into orbit. The telescope must be launchable (i.e., light weight and folded-up at launch) yet deploy to optical precision tolerances (fractional wavelengths). This has not yet been accomplished.

One prior concept concentrated on optical precision by using rigid one-to-three meter mirror segments in an aperture array wherein launchability concerns lead to the design of unfoldable segmented sparse aperture arrays. Another concept concentrated on reducing mass and improving deployability by employing a thin membrane mirror. However, optical precision concerns demand the presence of high frequency (space and time) adaptive optics.

SUMMARY OF THE INVENTION

The present invention is a lightweight, easy-to-deploy, full-aperture space telescope which solves both the launch and precision problems associated with conventional concepts. The present invention overcomes the difficulties inherent in the reflective telescope design for geosynchronous earth orbit (or any planetary orbits higher than the equivalent of low-earth orbit) by providing a diffractive telescope including two separate spacecraft located far apart but acting together as an eyeglass. One spacecraft is an eyepiece which is similar to a conventional, one-meter-class, space telescope and which would be too small to be useful from geosynchronous earth orbit by itself. The second spacecraft is comprised of an objective lens which functions as a magnifying glass and provides the necessary large aperture for observation by the eyepiece from geosynchronous earth orbit.

The present invention solves the problem of obtaining a high tolerance over a large aperture by the use of a transmissive optic for the large-aperture primary optic instead of a reflective optic. When a reflective surface is used to bend light through an angle x, the optical path error induced by any small surface ripple is (1+cos x) times the size of the ripple. If, instead, a transmissive surface is used, the optical error multiplier is (1−cos x). For small angles, the optical errors induced by ripples in transmissive surfaces are thus smaller than those for reflective surfaces by a factor of $x^2/4$. Expressed in terms of the tolerable ripple size, transmissive optics have a 16 times F# squared advantage over reflective optics. This advantage can be exploited by adopting a high F Number (hereinafter F#) design. For example, at an F# of 100, a transmissive primary optic tolerates ripples 160,000 times larger than can be tolerated by a reflective primary optic. In physical terms, a typical 300 angstrom tolerance for a visible-light reflector grows to 0.5 cm for a transmissive design. This huge advantage greatly eases the practical implementation of large space telescopes.

Space implementation difficulties and launch considerations are solved by using a very thin, flexible membrane for the transmissive primary optic of the present inventions. Membranes (only 10's of microns thick) are extremely light, easily packaged for launch, and potentially simple to deploy. The present invention gains these advantages by using diffraction rather than refraction as the basis of the transmissive magnifying optic. Diffractive lenses can be implemented with very thin membranes, while refractive lenses are much thicker, leading to systems which are more rigid, and harder to package and deploy.

The combination of the large F# required for the primary optic and its large aperture would require that a telescope have a focal length measured in kilometers. Placing a rigid, Earth-like, telescope of this length in space would entail severe weight, packaging and deployment problems. These difficulties are eliminated by separating the telescope into two spacecraft, the objective lens and the eyeglass and the eyepiece. Each are readily emplaced in space; the objective lens by virtue of its membrane implementation, and the eyepiece because of its more conventional (Hubble-Telescope-like) dimensions and rigid construction.

The eyeglass telescope allows 24-hour a day continuous high-resolution earth observations to be performed because it would be in geosynchronous earth orbit (GEO) (40,000 kilometer (km)). Given present-day optics, such resolutions have been only possible from low-earth orbit (LEO) (100–1000 km), and such orbits do not allow the observer to park on the object for longer than a few minutes. The observation times of such LEO-based imagery follow a schedule dictated by the orbit that is easy for other parties to predict. The eyeglass telescope of the present invention is also applicable to earth observation from mid-range earth orbit (5000–10,000 km) or for orbiting observation of other bodies of the solar system.

It is therefore an object of the present invention to provide earth and/or astronomical observation.

Another object of the present invention is to provide a high-image-quality space telescope having a relatively large aperture.

These and other objects and advantages and features of the present invention will become apparent from the following detailed description of the invention when considered in conjunction with the accompanying drawings wherein like or similar elements are identified by the same reference characters in the several views.

BRIEF DESCRIPTION OF THE DRAWINGS

FIG. 2A is a plan view of a radial single sided Fresnel lens' optical phase pattern suitable for use as an objective lens in the present invention.

FIG. 2B is a plan view illustrating a radial single sided Fresnel lens' optical zone pattern suitable for use as an objective lens in the present invention.

FIG. 3 is a plan view of a Cartesian two sided Fresnel lens' optical phase pattern suitable for use as an objective lens in the present invention.

DESCRIPTION OF THE PREFERRED EMBODIMENT

Figure 1:
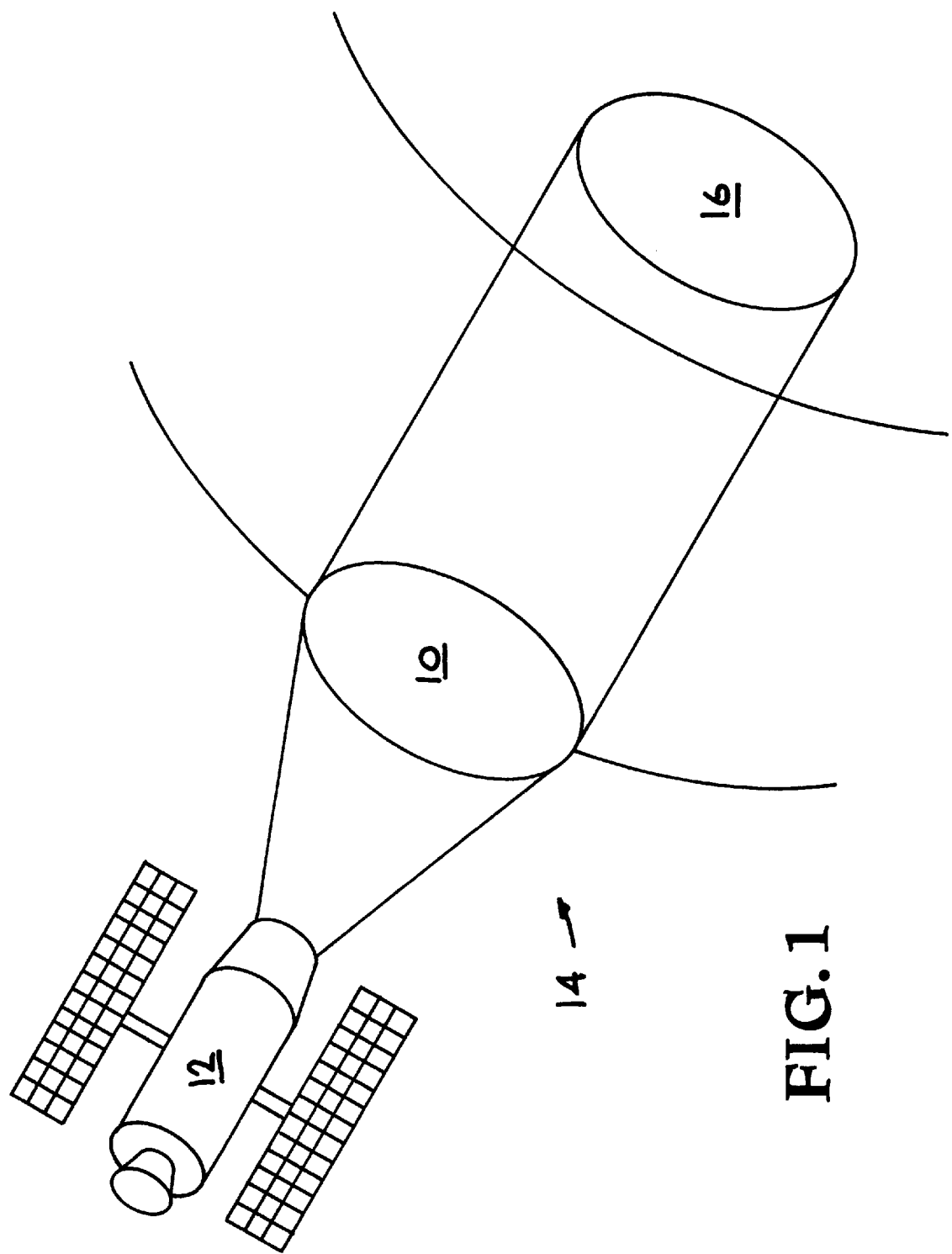
FIG. 1 is a pictorial view illustrating a telescope according to the present invention viewing a portion of the Earth from geosynchronous orbit.
Figure 5:
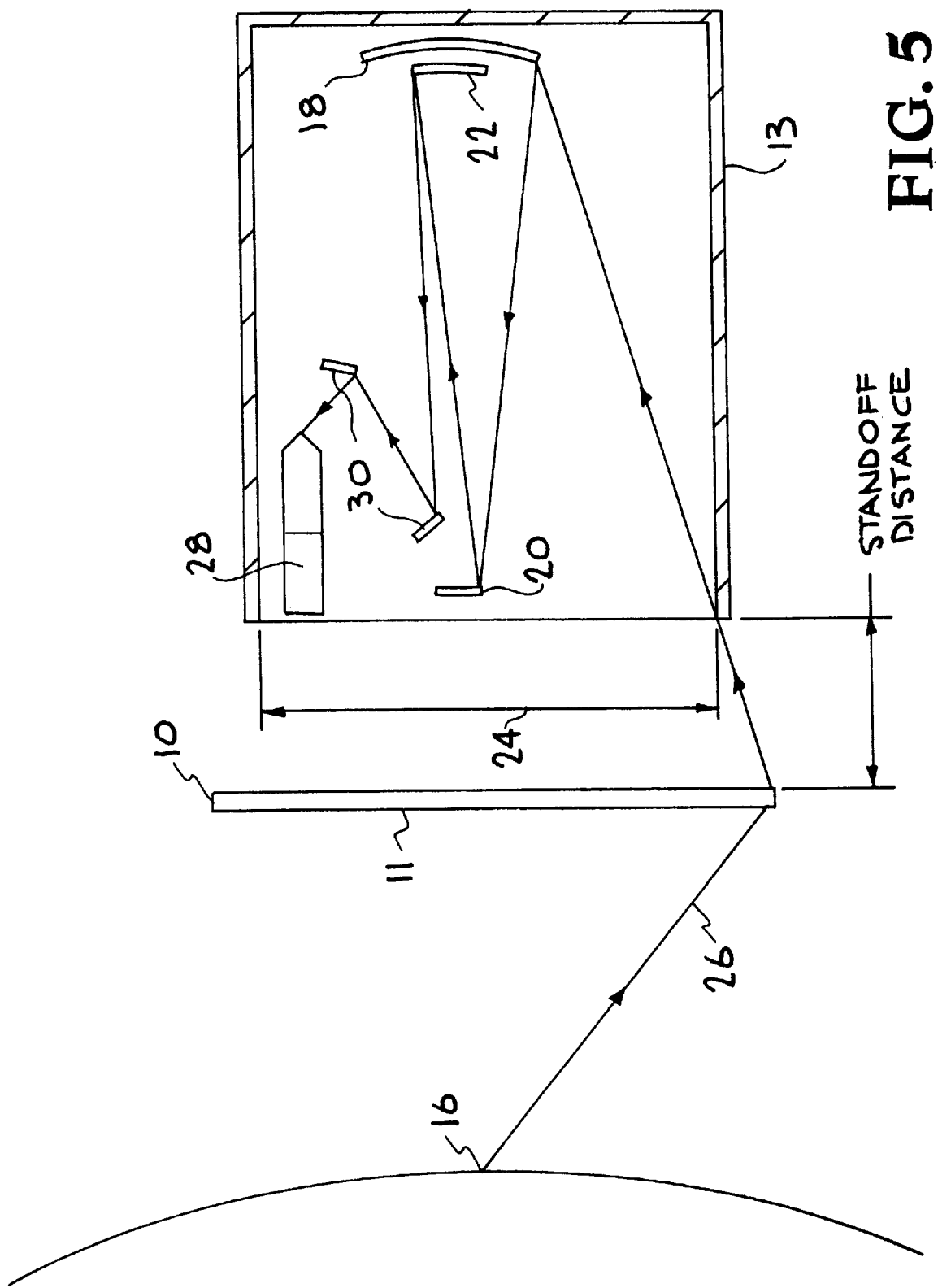
FIG. 5 illustrates optics of the present invention showing the path of the light from the object viewed to eventual picture storage.

Referring the FIGS. 1 and 5, the preferred embodiment of the invention consists of two separate spacecraft—an objective lens vehicle 10 and an eyepiece vehicle 12 (combined, both are also referred to herein as the Eyeglass 14)—in synchronized orbits (earth orbit or orbit of other celestial body), acting together to form a large aperture, diffraction-quality telescope. Light coming from an object of interest or target 16 is passed through a relatively large-aperture diffractive lens, for example, a Fresnel lens 11. The eyepiece vehicle 12, which is located at a large standoff distance behind the objective lens vehicle 10, is controllable to be maintained in alignment relative to the objective lens vehicle 10 by conventional thrusters (not shown).

The separation between objective lens vehicle 10 and eyepiece vehicle 12 is so large (up to several Kilometers), that at any stand-off distance, the eyepiece aperture 24 fails to capture all the wavelengths of light 26 which are diffracted by the Fresnel lens. This occurs because each wavelength of light diffracts at a different angle, and only those falling into a narrow bandwidth will be captured at any one standoff distance. What light is captured in the eyepiece aperture 24 is reflected off a primary mirror 18 and then reflected off a secondary mirror 20, which then reflects to an inverse Fresnel mirror 22. An inverse chromatic distortion is effectuated on the captured light by the inverse Fresnel mirror 22, and thus provides a chromatic correction.

This correction raises the spectral bandwidth of the eyeglass telescope from $\Delta\lambda/\lambda \sim 10^{-6}$ to $\sim 10^{-1}$, a crucial improvement for telescope applications. To achieve this chromatic correction, an accurate focus is required between the Fresnel lens 11 and the inverse Fresnel mirror 22. After applying the chromatic correction, the inverse Fresnel mirror 22 bounces the light onward, forming an image of the target 16 at a sensor array (typically a CCD array) 26. Pictures are stored in a memory system, and/or electronically transmitted to a point of use 28.

The distance the light from the object must travel to the sensor array 26 may vary. In adverse circumstances, the Fresnel lens 11 may not be flat or exactly normal to the line-of-sight. This causes variations in wavefront distortion that, if damagingly large, can be corrected with an adaptive optics system 30. In one embodiment, such adaptive optics system 30 may comprise a deformable mirror, a wavefront sensor to detect optical aberrations, and electronic circuitry to compute a correction and then apply it to the deformable mirror.

In the present invention, the object being imaged can either be on the earth's surface (for earth observation applications), or be the near surface of a distant planet or star (for astronomical applications). If the object image is on earth, the Eyeglass comprises a large-aperture Fresnel lens 11 that functions as a magnifying glass, and at least one imaging satellite functioning as an eyepiece. The large-aperture Fresnel lens 11 and the imaging satellite(s) 12 are positionally synchronized to continually point towards the target 16. The Eyeglass 14 is preferably parked in a geosynchronous orbit zenith to a point-of-interest on the ground. In such an application, it is believed to be possible to construct the objective lens with an aperture of 25–50 meters. The standoff distance between the objective lens vehicle 10 and the eyepiece vehicle 12 could then be on the order of several kilometers, depending on what band of light needs to be studied. The aperture 24 of the eyepiece itself will likely be at most about two meters in diameter; larger values are optically feasible and would provide greater spectral coverage, but require increasingly massive eyepiece spacecraft 12. For astronomical applications, the Eyeglass 14 could also be based at orbital locations further out than GEO. Such astronomical embodiments could employ larger apertures (for the objective lens 10 and/or the eyepiece 12) and longer standoff distances.

Due to the large diameter of the objective lens 10, it is a challenge to put it into orbit and then deploy it in a way that does not compromise its optical qualities. Therefore, in preferred embodiments, the objective lens 10 is constructed of a flexible material that can be bunched up into a small package for its trip into orbit. The deployment is such that the package is released in space and spun so that centrifugal force will spread it out flat. Since such spinning will impart a net angular moment 34 (left hand rule) to the objective lens 10, a gyro-wheel 32 of near-equal, but opposite, angular moment is counter-rotated 36 (left hand rule) within a central encasing 37. The balance between the opposite angular moments is controlled so that the net angular moment of the whole objective lens vehicle 10 imparts the one-turn-per-orbit rotational behavior required for earth observation. The eyepiece's lateral (off-nadir) position is controlled in order to align the line of sight of the eyepiece optics 13 to the precise direction of the target-to-be-viewed 16. Several such eyepiece vehicles 12 can be associated with a single objective lens 10 to make simultaneous observations for a photomosaic and/or wide-spectrum study.

The objective lens 10 must be light-weight and easily deployed in space yet able to maintain tight tolerances. To effect the magnifying glass function, a phase profile is preferably applied to a very thin, flexible, transparent polymer membrane 38. The material used for the Fresnel lens 11 must be thin and flexible, transparent to the imaging wavelengths, areally uniform in thickness and properties, have a low thermal expansion coefficient, and survive and function in the space environment. At present, a good material choice appears to be a specialized variety of polyimide. Such materials resemble KAPTON in basic properties, but newer varieties have been created which are more transparent in the visible spectral regions and/or which have much lower thermal expansion coefficients. Polyimides are able to withstand the radiation environment associated with high orbit. There are several alternative materials possible, e.g., polystyrene, polyvinyl carbazole, and various fluorocarbons. But the reaction of such polymers to space has not been studied as completely as for KAPTON-like polyimides.

In mitigation, atomic oxygen bombardment is not a problem in such high orbits. Thus the chief environmental challenge faced is UV-induced degradation, which must probably be dealt with by using thin protective coatings on both surfaces of the polymer.

After deployment, this membrane 38 must hold its positioning tolerances while viewing targets and must be capable of swiveling in order to point to targets that are significant distances from nadir. The required tolerances are about twenty microns in-plane (stretching), and one centimeter out-of-plane (flatness). As a comparison, the mirror of a reflective telescope has tolerances of about 300 Angstroms.

Figure 4A:
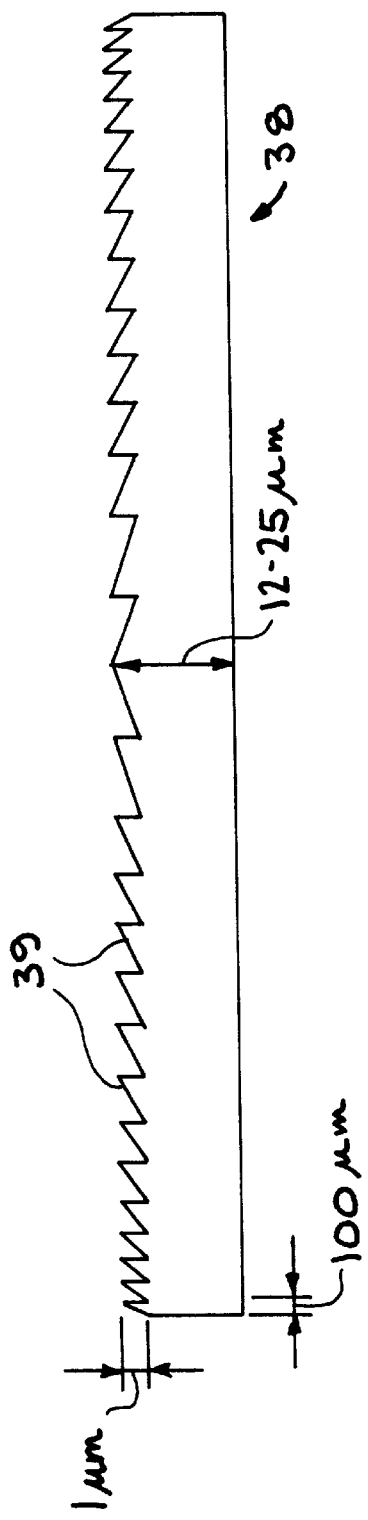
FIG. 4A is a profile of the Fresnel lens of FIGS. 2A and 3 showing their thinness as well as their phase groove pattern.

The thin membrane Fresnel lens 11 acts as a diffractive lens to incoming light. Referring to FIGS. 2A and 4A, the diffraction is caused by embedding a repetitive optical phase and/or transmission pattern 39 on the membrane 38. Referring to FIG. 2B, relatively low efficiency zone-plate designs would utilize simple present/absent opaque layers 43, while higher efficiency designs (using either continuous or digital phase profiles) would be implemented on the membrane either by impression, deposition, or subtraction techniques 40 and 42, as illustrated in FIG. 2 and FIG. 3, respectively. The diffraction-causing profile 39 is emplaced on the membrane 38 either in a pre-assembly or post-assembly process. In the pre-assembly method, smaller-sized membranes (strips or gores) are finished and then joined together into the full-sized primary; in the post-assembly method, the full-sized membrane is laid out and the pattern emplaced on it either in a batch or serial fashion.

The largest source of distortions in space structures is often due to thermal expansion, e.g., either from overall temperature changes, or from material/thermal inhomogeneities. These are a potential source of large in-plane distortions for the objective lens. The presence of overall temperature changes is difficult to avoid in most Eyeglass applications, as the objective lens vehicle 10 is exposed to sunlight and since the orientation of the objective lens relative to the solar direction can change daily. The temperature changes can be addressed in the objective lens 10 in two ways, both of which are utilized in the preferred embodiment.

The first approach, is to minimize the magnitudes of the forces at work, e.g., by fabricating the objective lens 10 with a bulk, rather than surface, absorbing material. So when the direction of incoming solar photons changes, the change in intercepted-flux will be largely balanced by the change in pathlength within the material. As a result, the temperature changes little with large changes in angle. The second approach is to provide for spatially uniform heating. Since the objective lens 10 is basically a flat membrane 38 uniformly exposed to the same flux, avoiding the material inhomogeneities of supporting structures such as struts or rims will be very helpful.

Even after utilizing the above mitigation approaches, there will be uniform areal expansion/contraction resulting from the overall temperature variations caused by changes in the solar direction. A fundamental property of quadratic-profile diffractive lenses can be used to counter this effect, wherein uniform areal changes simply change the focal length, and not the quality of the focus. The Eyeglass 14 responds to these uniform thermal changes simply by making small adjustments (<0.1%) in the standoff distance between the objective lens vehicle 10 and the eyepiece vehicle 12. The size of this motion is somewhat different (typically half as large) as that given by the focal length change of the objective lens 10; the precise amount is chosen to also maintain the focal relation between the objective (Fresnel) lens and the eyepiece's inverse Fresnel lens 22.

Thermal distortions may be avoided substantially or altogether by placing a free-flying sunshade between the objective lens 10 and the Sun. The challenge to this approach would be the large size required because the objective lens vehicle 10 is itself so large. It would also be onerous to keep the pair properly positioned.

Another method that can be used to handle small temperature changes or non-uniformities is to actively heat or cool the membrane 38 to maintain a fixed, uniform temperature everywhere. One challenge to this approach would be the amount of active power needed. Active cooling would be harder to apply than heating, so heating everything else to the same level seems the best choice when counteracting positive thermal changes.

The in-space implementation which handles the deployment, tolerances, and pointing uses a rotating membrane lens 10 with a central encasement 37 containing a counter-rotating gyro-wheel 32. The furled-up objective lens 10 is initially deployed with a small-to-zero spin-rate. Zero spin-rate is used for most astronomical applications and one revolution-per-day for geosynchronous earth observation applications.

Figure 6:
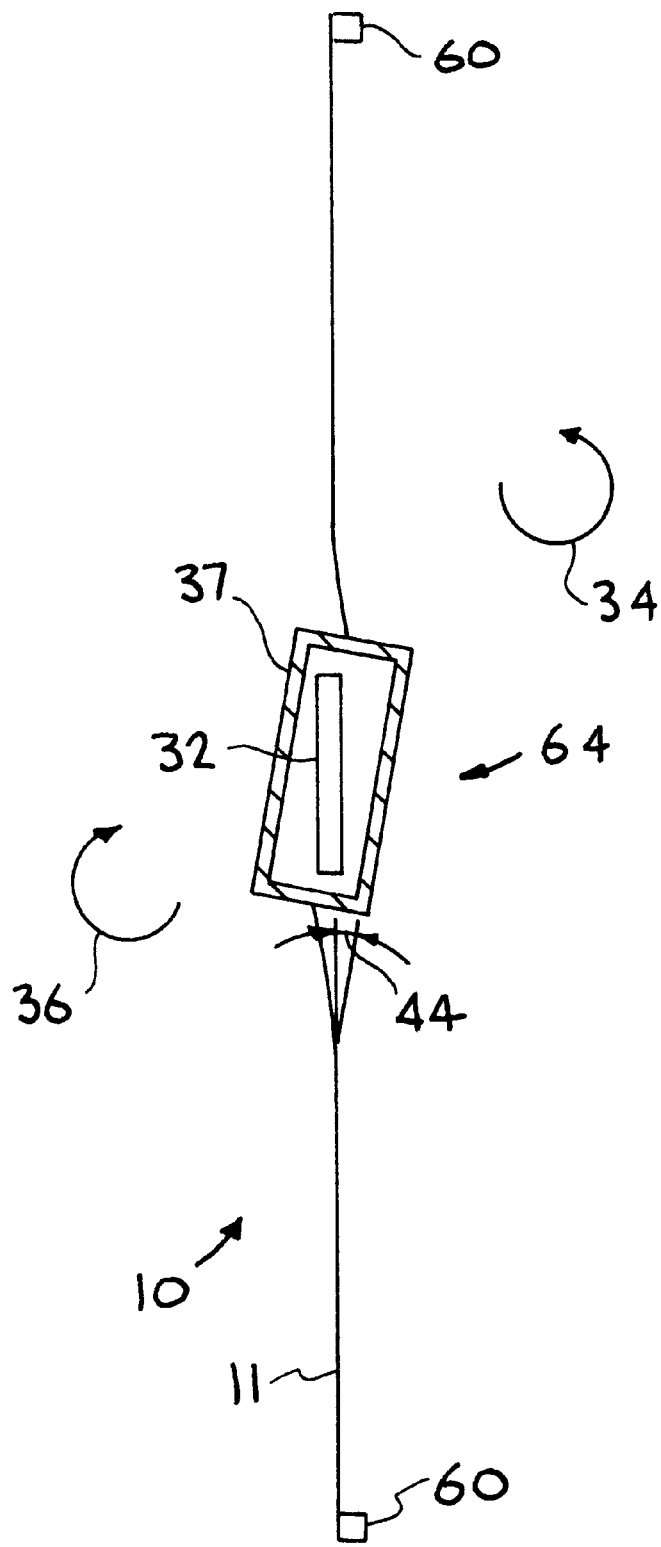
FIG. 6 is a cross section of the preferred embodiment for the objective lens which comprises a Fresnel membrane, a center mounted gyro-wheel, beacon, and corner-cubes.

Referring to FIG. 6, the central, axially oriented, gyro-wheel 32 is then spun-up as illustrated by spin symbol 36. This causes the objective lens 10 to counter-rotate as illustrated by spin symbol 34 and to deploy under centrifugal force. An example such a gyro-wheel is Honeywell's commercial gyro, model HM-1800. After deployment, the continuing axial rotation stiffens the objective lens' membrane 38, holding it taut and maintaining the necessary optical tolerances. Spin rates of 1–10 rpm are chosen to balance the competing requirements for in-plane and out-of-plane stiffness as well as those pointability. The in-plane tolerances are met by having enough tension, hence spin-rate, to pullout wrinkles, yet not so much that variations in material properties modulate the nominal, designed for, stretching beyond the tolerance levels. The out-of-plane ripples are driven by spatially varying loads such as those due to solar radiation, gravity gradients and swiveling-induced angular accelerations. They are held below the tolerance levels by sufficiently high spin-rates.

The use of a counter-rotating central gyro-wheel 32 is crucial in permitting a rotationally stiffened objective lens to be affordably and agilely swiveled to track targets. The primary swiveling requirement of a geosynchronous Earth observation objective lens is the once-per-day revolution needed to track the Earth. The counter-rotating design achieves such with no external torque requirements. The internal torque needed to process the rotating membrane is achieved by a slight angular tilt 44 between the central core 37 containing the gyro-wheel, and the outer flexible membrane. The out-of-plane shape induced transmits the torque throughout the membrane 10. The size of this displacement depends on the axial spin-rates, and is kept below the optical tolerances by the chosen spin-rates.

The torques (typically smaller torques) needed to redirect the objective lens 10 toward different targets are achieved by reorientations of the central gyro-wheel 32, either by physical tilting of the gyro-wheel, or by activation of smaller transverse control gyro-wheels (not shown). The out-of-plane ripples induced by such maneuvers are reduced below optical tolerance levels by keeping the maneuver time-scales sufficiently longer than the period of the excited vibrations. The chosen spin-rates permit useful re-targeting rates for geosynchronous earth orbit applications.

The presence of a rigid core 37, despite extending for only 4% of the aperture, does prevent fully-uniform areal motion in response to overall temperature changes. This results in distortions which cannot be fully compensated for by a change in the eyepiece spacing. For presently anticipated design parameters, this effect is not optically significant. For situations where the distortions do become significant, the objective lens 10 would include a temperature dependent compensating attachment of the membrane to the central encasement thereby avoiding these non-uniform thermal distortions.

This technique of combining a large, flat, rotationally-stiffened membrane 38 with a small, centrally mounted core 37 containing, counter-rotating gyro-wheel 32 can be used to deploy and/or controllably tilt other types of spacecraft than the diffractive lens vehicle 10 of the present invention. Two examples of other such applications are solar sails and solar reflectors; both share the objective lens's need for deployment, stiffening, and maneuverability and can benefit from the gyro-wheel system disclosed here.

Figure 7B:
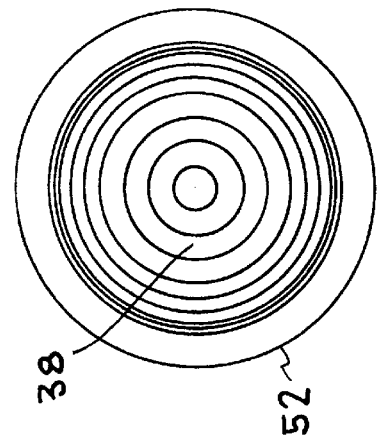
FIG. 7 provides four alternate objective lens embodiments for supporting the Fresnel membrane.
Figure 7D:
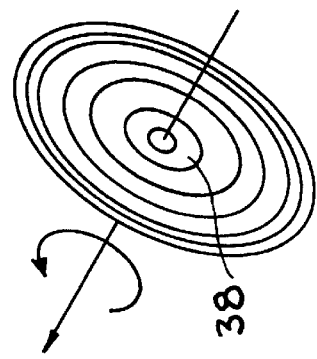
Figure 7A:
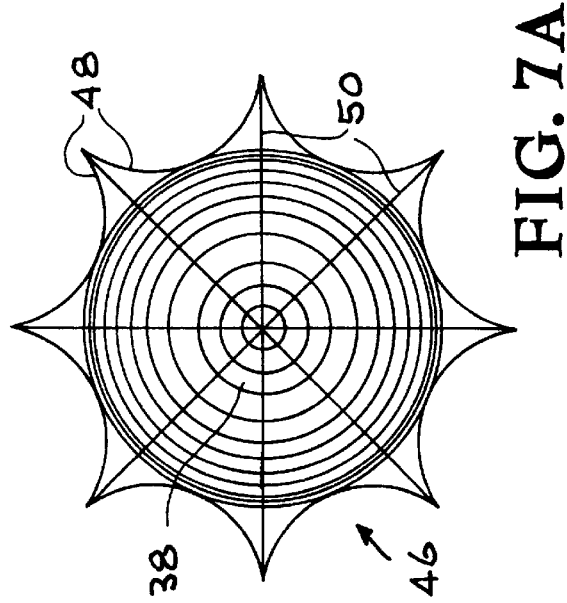

FIGS. 7(A)–(D) illustrates alternative techniques for supporting the membrane 38 of the objective lens vehicle 10. As shown in FIG. 7A, the membrane 38 is supported by a spoke-truss and suspension-cable design 46. Here the membrane 38 is held taut by being pulled radially outward along its rim. These outward forces are circumferentially transmitted by suspension cables 48 to several radial spokes 50 which are placed in compression, thereby balancing the outward rim forces. In effect this is a radial suspension bridge, in which the spokes 50 act as the pier-towers and the stretched membrane 38 as the continuously-supported roadbed. The packaging and deployment is handled by using telescoping, or otherwise extensible, booms for the spokes. The chief challenges for such approach relative to the preferred counter-rotating design are thermal distortions driven by the different properties of the membrane, cables, and spokes and by non-uniform heating of the membrane in the neighborhood of the spokes.

FIG. 7B shows the membrane 38 held in-shape by a tension loaded rim 52. The membrane 38 is held taut by being pulled radially outward along its rim 52. The force balance is maintained by the tension-loaded rim 52. The rim 52 must be compactly packaged during launch, yet be deployable in-space into a circumferential beam capable of carrying the tension loads. Such could be achieved by a deployable truss design or by more flexible gas-inflated concepts in which the tension-load capability is met either by maintaining internal gas pressure or by an in-space-rigidized foam. The chief challenge for such approach relative to the counter-rotating design is to reduce the effect of rim distortions driven by the different thermal properties of the rim and membrane, by thermal warping as one side of the rim is heated more than the other, or by uneven foam rigidization.

Figure 7C:
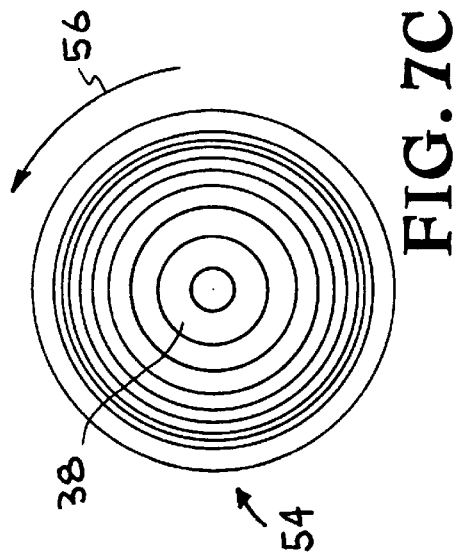

Another alternative embodiment of the tension-loaded rim is to use a current-loop 54 in the rim to pull it outwards and hence tauten the membrane as shown in FIG. 7C. This is an inherently flexible design which is self-deployed as the rim current 56 is introduced. The 10K Amp current levels involved are high enough to require superconductors. The high $T_C$ superconductors could be used, being cooled passively by sufficient wrapping thickness of multi-layer insulation. While in principle the interaction of a net objective lens magnetic moment and the in-space B-fields could be used to supply maneuvering torques, the unsteady solar-storm-driven fluctuations in B-fields makes a zero magnetic moment design more practical. This uses toroidal rather than circumferential current paths in the rim. The chief challenges for such approach relative to the counter-rotating design are reducing the effect of rim distortions driven by the different thermal properties of the rim and membrane, and by the material challenges posed by the in-space, high current-density use of high $T_C$ superconducting materials.

Another approach is to use a rotating membrane 58 as shown in FIG. 7D without having a counter-rotating central gyro-wheel to provide counter rotating forces. This design achieves the same stiffening as the counter-rotating approach, and has a similar deployment—here the objective lens vehicle 10 must be externally spun-up before deployment, rather than self-spun during deployment. The challenge for such approach relative to the counter-rotating one is the difficulty in swiveling the objective lens. Here the system retains the full gyro-moment used to stiffen the membrane and hence has a large rotational inertia. For astronomical applications, the torquing requirements are likely affordable, but for earth observational telescopes they are difficult to meet.

The angular maneuvering requirements of all these alternative magnifying glass implementations can be met either by gyro-wheels, by interaction with external B-fields, or by reaction jets. The non-rotational alternative embodiments have little angular inertia, hence relatively small torque requirements, so any of the torque schemes can be used. The rotational approach has greater needs, particularly for earth observational applications, so magnetic torquing is unattractive. The chief challenge is the distribution of torque from the localized generation site(s) throughout the bulk of the membrane.

The objective lens 10 is a high-F# diffractive lens. It imposes a rotationally symmetric phase profile onto the transmitted light, bringing it to a distant focus at F#~100. The high F# utilized makes the Eyeglass telescope extremely tolerant of implementation errors, allowing large feature-sizes, and placement errors, in the phase-profile 39, and permitting very large out-of-plane surface ripples. The phase profile is nominally chosen to produce a high efficiency central focal-spot 32, using either a continuously varying profile or a digital profile with more than two levels.

Alternative phase-profiles can be employed, either to permit easier implementation or to permit multi-spectral operation. The simplest optical profiles to implement are binary ones, having just two optical states. These are easiest to build, but offer less central-spot efficiency than the nominal profile. One simple, but low efficiency, profile is the zone-plate, involving alternate regions of high and low transmittance. Another, higher efficiency, profile is the phase-plate, in which alternate regions have optical path-lengths differing by one-half wavelength as shown in FIG. 2A.

A multiple color-band objective lens can be made using alternative diffractive lens designs. One simple approach is to use harmonics of the Fresnel lens' design frequency. This utilizes the fact that a blazed Fresnel lens designed to operate at $\lambda$ will also focus wavelengths $\lambda$2, $\lambda$/3, etc. Hence, for example, the lens profile could be designed for $\lambda$=1.5 microns, and it would also function at $\lambda$ values of 0.75, 0.50, etc. microns. Another approach is possible which provides more freedom in selecting the operating frequencies. This design uses a sequence of zone-plates placed atop one another. They utilize quarter-wave dielectric multi-layers, which are "off" only for a specific spectral-band, rather than using spectrally-insensitive metal coatings to generate the low-transmittance off-states (as shown in FIG. 2B). As a result, each of the zone-plates operates on a separate spectral-band and is transparent to all other bands. Hence the zone-plates do not interfere with each other, and a multi-band objective lens can be formed by stacking-up zone-plates with different spectral-bands.

Figure 4B:
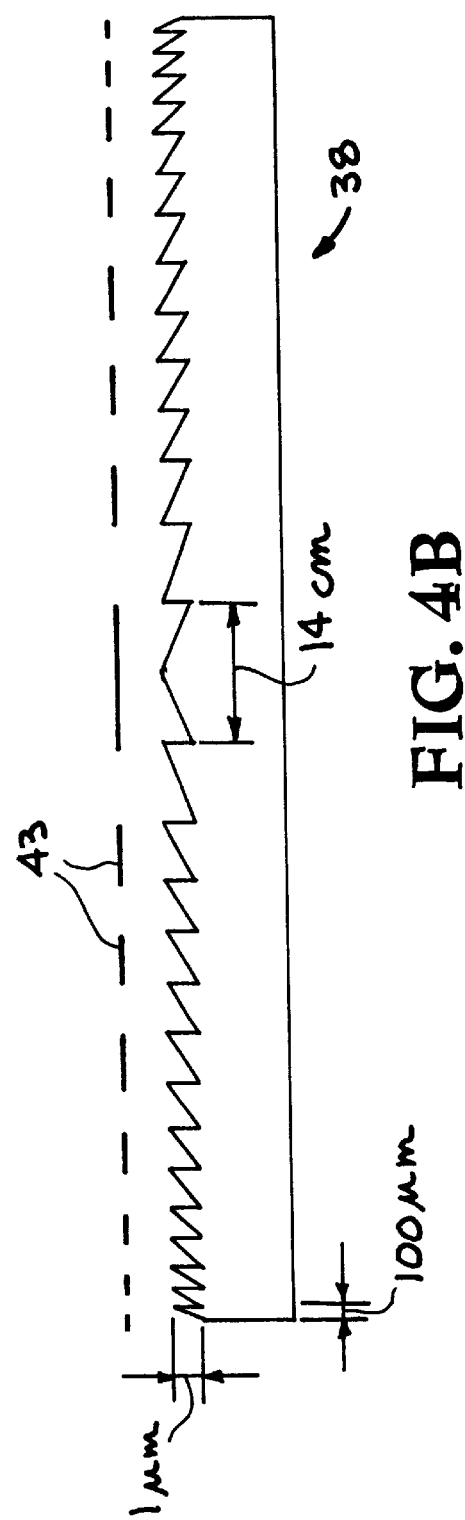
FIG. 4B is a profile of a Fresnel lens incorporating the alternating concentric opaque rings of FIG. 2b into a zone/phase membrane pattern.

The preferred embodiment utilizes a simultaneous combination of a multi-harmonic phase plate and a spectrally-specific zone-plate which are employed to provide coverage in both the visible-to-near-IR region as well as the mid-IR or thermal-IR region, as illustrated in FIG. 4B. This would permit the eyeglass to image targets both during the daylight and the nighttime hours. While it is possible in-principle to extend the multi-harmonic phase-plate approach all the way from the visible up to mid-IR or thermal-IR regions, this is difficult to achieve in practice because the thickness of membrane material needed to provide the necessary phase-shift becomes undesirably large. Therefore, the eyeglass' nominal approach for providing such spectral coverage is to use a spectrally-specific zone-plate for mid-IR and/or thermal-IR regions. Thin layers of a material opaque in the desired IR spectral regime are deposited on the surface of the membrane 38 with the proper zone-boundaries to focus at the eyepiece 12. This material is chosen to be transparent in the visible-to-near-IR regime, so does not interfere with the objective lens's multi-harmonic phase-plate operation in those lower wavelengths.

The eyepiece vehicle 12 serves as the image collection component of the overall Eyeglass telescope 14. It differs from other similarly-sized, standalone, telescopes, such as the Hubble Space Telescope, in only two major respects. Optically it handles processed, rather than virginal, light, and it must precisely station-keep relative to the magnifying glass. In many other respects, such as its power supply, its basic housekeeping systems, its sensor arrays, its telemetry systems, its command-control systems, etc., it is little different from other space telescopes. Systems developed and used on those could be adapted for use on the eyepiece vehicle 12.

Referring to FIG. 5, the eyepiece optical system 13 is designed to receive the incoming light from the Fresnel lens 11 and to develop high quality images, diffraction-limited with respect to the large aperture of the objective lens 10. The chief challenge in doing so is to remove the large chromatic aberrations introduced by the Fresnel lens 11. The basic approach used to remove chromatic aberrations is to use a transfer telescope within the eyepiece to perform a one-to-one mapping between the surface of the objective lens 10 and that of a chromatic corrector 22 element within the eyepiece 12. The chromatic corrector 22 contains a defocusing diffractive element whose optical strength at each point is the inverse of that of the corresponding point on the objective lens 10. Such method insures that the chromatic angular-spray imposed upon a ray-bundle as it passes through the Fresnel lens 11 is removed during its passage through the chromatic corrector 22. In order to permit the eyeglass to have diffraction-limited performance, the one-to-one mapping done by the transfer telescope must be near-perfect. Therefore, the transfer telescope should be achromatic and aberration-free over its required field-of-view, which is the full extent of the objective lens 10 as seen by the eyepiece 12.

The preferred embodiment eyepiece optical system uses three major optical elements to eliminate the chromatic aberrations imposed by the objective lens 10. Separate optical elements are used near the sensor array 26 to increase the viewing-theater of the eyeglass and to decrease its sensitivity to transverse motion. The major optical chain consists of a two mirror transfer-telescope (mirrors 18 and 20) and a single-element chromatic corrector 22 (inverse Fresnel lens). The eyepiece optics 13 are of an axial Cassegrain design (image inverse from 22 through 20), having a primary mirror 18 and a secondary mirror 20. These mirrors 18 and 20 have aspheric conic surface profiles. The radii-of-curvatures are chosen to satisfy paraxial requirements for the chromatic correction, and the asphericity conic coefficients being chosen to eliminate $3^{rd}$ order spherical and coma aberrations. The aperture of the primary mirror 18 is the largest in the eyepiece 12, and determines the maximum spectral bandwidth which, using the nominal magnifying lens design, will be processed by the eyepiece. The chromatic corrector 22 is a hybrid element, having a defocusing diffractive lens (not shown) placed on the surface of a focusing mirror.

The basic shape of such element is chosen so that it lies upon the tangential image surface of the transfer telescope. Such choice eliminates $3^{rd}$ order tangential astigmatism aberrations. The design of the eyepiece optical system 13 exploits the fact that rays leaving the objective lens 10 are spread apart by diffraction and hence form a radial spray. As a result the telescope does not have to eliminate sagittal astigmatism aberrations. A final $3^{rd}$ order aberration, distortion, is eliminated by using a non-quadratic phase profile for the diffractive lens in the chromatic corrector 22.

Light leaves the chromatic corrector in a basically, to much less than one wavelength phase error, achromatic spherical wave focused upon the eyeglass' sensor array 26. Such three-element design for the major optical chain also serves to greatly decrease the sensitivity of the eyeglass to standoff distance errors between the objective lens 10 and the eyepiece 12. The tolerable error for a geosynchronous Earth orbit 25 meter aperture eyeglass is thereby increased from about one centimeter up to about 20 cm, an improvement that greatly relaxes the eyepiece's alignment requirements.

A color correction is needed for all the operating wavebands, and is provided simply by applying the same multi-wavelength surface to the inverse Fresnel mirror 22. The mapping of objective lens to Fresnel corrector 22 is achromatic and so simultaneously acts for all spectral bands. The fact that mid-IR/thermal-IR operation, if implemented, is achieved by a zone-plate rather than a blazed phase-plate does reduce optical throughput, but this is offset by the much greater source strengths at such wavelengths.

The eyepiece's inverse Fresnel lens 22 can be made to serve one other role beyond its essential task of chromatic correction; it also acts as a noise reduction filter. In the preferred (and simplest) embodiment of the Eyeglass telescope 14, the large objective lens 10 is not Sun-shielded. Some fraction of the sunlight that hits it will be diffusely scattered into the eyepiece 12. Any such in-band photons that reach the sensor array 26 contribute a background glare, potentially masking the desired signal from the more-distant target. There are two types of noise photons contributing to this glare, a direct set that (after their initial scatter at the objective lens 10) mimic signal photons and proceed directly to the sensors 26, and others that travel an indirect path via a second diffuse scatter at the Fresnel corrector 22. The direct set of noise photons generates a larger glare and, particularly for astronomical applications, should be reduced in order to improve the eyeglass's performance. The eyepiece optics 13 are designed to achieve a great reduction in the amount of this direct glare. In order to reach the sensors 26, light must pass through the Fresnel corrector 22 which applies both a specular reflection and a diffractive-profile scattering. Its curvature is such that the diffractive scattering is crucial—light that only undergoes specular reflection cannot reach the sensors 26. Proper diffractive scattering occurs only for light that is spatially correlated over distances much larger than that of the surface features. Because of the eyepiece's design, noise photons originating at the objective lens 10 are largely uncorrelated when they reach the Fresnel corrector 22, and hence need a second scatter there in order to reach the sensors 26. For embodiments where maximal noise reduction is required, the phase profile of the Fresnel corrector 22 might be implemented as orthogonal one dimensional patterns rather than a (far more straightforward to implement) radial profile.

The eyepiece optical system 13 preferably also include touch-up optical elements near the sensor array 26. These consist of a small flexible mirror designed to improve the viewing-theater of the eyeglass, and two flat turning mirrors 30 designed to keep the image "fixed" onto the sensor array 26 during exposures. The viewing-theater of the eyeglass is defined as the off-axis region that can be imaged simply by translating and swiveling the eyepiece, without having to swivel the objective lens itself. Optically, the effect of such viewing condition is manifested by a tilt of the plane of the objective lens 10 away from the telescope's optical axis. The size of such tilt that can be tolerated determines the viewing-theater that can be imaged without having to re-point the objective lens 10. The optical aberration induced by small tilts is spatially smooth, and can be eliminated by applying a small canceling wavefront shift into the beam as it approaches the sensor 26. Such is readily done with a small-aperture deformable mirror, which applies a smooth, low-spatial-frequency phase shift to the incoming light. The amount of correction applied is basically proportional to the tilt present, i.e., to how far off-axis is being viewed. When viewing targets within the eyeglass' viewing-theater, the eyepiece vehicle 12 moves to the appropriate location along the focal surface of the objective lens, stops, and images the target 16.

In practice, unless the stopping is "perfect," there will be some residual drift during the image-taking. Given the large standoff distance tolerances, drift along the line-of-sight is unimportant, but transverse drift-tolerances are much smaller. These are corrected by a simple system of two turning mirrors 30 which effectively freeze the image onto the sensor array during the imaging interval.

Several variations of such eyepiece optical design can be employed. The above system is only one, albeit a particularly simple, implementation which meets the optical requirements. The key optical requirement to achieve diffraction-limited chromatic correction is the process described above—performing a one-to-one mapping of the objective lens 10 onto a defocusing diffractive lens 22 which cancels-out the chromatic errors, and is then focusing the light onto a sensor array 26. Variations can be employed either for the transfer telescope that does the one-to-one mapping, or by introducing other optical elements to aid in the post-chromatic-correction focusing.

The transfer telescope can use lenses with-or-instead-of mirrors. A basic challenge in doing so is to keep the telescope achromatic, so that the magnifying glass errors can be canceled by the defocusing diffractive lens. Mirrors are inherently achromatic, whereas lenses are not. If lenses are used, multiple ones must be combined in an attempt to precisely cancel-out their chromatic dispersions. A practical difficulty is that large lenses are much more heavy and expensive than large mirrors, so cannot readily be used as the primary element in an eyepiece of the larger size-ranges envisioned here, with multi-meter apertures.

Single element transfer telescopes are not attractive options to the nominal two mirror design. A single mirror will not correct enough aberrations, a single lens might be aplanatic but its weight and cost would limit the aperture of the eyepiece. A fundamental difficulty with single element transfer telescopes, lens or mirror, is that they are long. Multi-element telescopes can be designed, as in the nominal design, to greatly shorten the overall length of such telescope and hence of the eyepiece.

A single lens transfer telescope design has been built before (Faklis, et al). Such is not a practical choice for the eyeglass for several reasons. It does not form either an aberration-free or an achromatic image at the chromatic corrector, and it would result in a much longer and (if the same aperture) heavier and more expensive eyepiece vehicle.

Many different multi-element transfer telescopes are practical and could be used in place of the nominal two mirror design. One two-element alternative includes non-axially symmetric optical layouts to reduce obscurations and thus enhance image strength and quality; such designs have been successfully developed for eyeglasses. Another two-element alternative approach would replace the reflective secondary with a nearly-achromatic lens. Telescopes with three or more elements admit even more alternative embodiments of the present inventions and offer potential features, one being the ability to use a flat, rather than curved, diffractive corrector lens.

There are many possible alternative embodiments of the present inventions to the use of a single hybrid element to do the final chromatic correction and focusing. One option is to use a diffractive/refractive hybrid rather than the nominal diffractive/mirror one. This can be useful in further reducing chromatic dispersion if lenses are used within the transfer telescope. Another option is to add further optical elements after the chromatic corrector. These can be used to give more freedom in the size, orientation, and placement of the sensor array.

Variations are also possible in the touch-up optics 30 near the sensor array 26. The element used to increase the eyeglass' viewing-theater is just an adaptive optical phase corrector. The requirements here are considerably less challenging, in both spatial and temporal frequency, than in several other applications, so a variety of different methods exist to perform such task. Similarly, the turning mirrors used to freeze-out transverse motion have been implemented before in other systems. Several different configurations can be employed here.

In order that the eyeglass 14 can function as a high-precision space telescope, its two separate components, the objective lens 10 and the eyepiece 12, must cooperate, meeting several relatively precise alignment tolerances. The nominal method used to do so is to assign most of the alignment chores to the eyepiece vehicle 12.

The objective lens 10 has few translational control responsibilities. It is supplied with small, core-mounted, electrical thrusters for orbital maneuvering and aligning. These permit the Eyeglass 14 to be moved from one longitudinal location to another, thereby improving coverage of different target sets. However, the frequent motions needed to maintain precise Eyeglass inter-component tolerances, as well as those needed to point toward different targets 16, will be done by the eyepiece vehicle 12. The eyepiece 12 is responsible for alignment relative to the, largely passive, objective lens 10. The observational portion of such task, monitoring their relative positions, is done interferometrically, using electronics, lasers and sensors on the eyepiece 12 and passive corner-cube reflectors 60 (shown in FIG. 6) on the objective lens 10. The decision-making task is handled by computers on-board the eyepiece 12. Because of the simple, nearly-free-space, locations in which the Eyeglass 14 will be used, simple algorithms suffice. The implementation task, actually thrusting the eyepiece 12, has two aspects, resisting the environmental forces that tend to separate the two spacecraft, and moving the eyepiece along the objective lens' focal surface to image desired targets. In the nominal eyeglass system, both tasks are done using low-thrust electrical rockets (not shown).

Several variations to such Earth orbit alignment responsibilities can be employed, using different monitoring or force-application approaches. There are several different techniques which will provide accurate positional information over the several kilometer standoff distance between the eyeglass components. Systems can, for instance, use radar rather than optical bands, can use purely passive observations, or can place beacon(s) 64 and reflectors 60 on opposing vehicles. Beacon(s) 64 and reflectors 60 cooperatively are used to align and determine distance between the objective lens 10 and the eyepiece 12.

There are also several different alternatives to the nominal basic strategy of having the eyepiece 12 use thrusters to maintain alignment relative to the objective lens 10. One option is to switch their roles, making the objective lens 10 the more active vehicle. Such has the obvious advantage, given that the objective lens 10 is significantly lighter than the eyepiece 12, of requiring less fuel. The challenge here, and the reason it is not the nominal approach, is that the eyepiece 12 is a much more rigid vehicle than the magnifying glass 10, and that moving the objective lens 10 must be done gently to avoid setting up vibrations.

Another basic option is to tie the two vehicles together with a tether. Such is advantageous in eliminating the fuel costs associated with inter-orbital drift, these forces are generally repulsive and can hence be resisted with a simple tether. The challenge here, and the reason it is not the nominal approach, is that vibrations can be fed into the objective lens by such cable. Several sources exist, for instance the movement of the eyepiece 12 to different imaging locations, and the thermal response of the tether itself to changing Sun-angles. Careful control of such vibrations is required to implement such approach. Another option, serving to reduce inter-orbital drift in geosynchronous applications, is to attach a counterweight, via a long tether, to one of the vehicles in such a way to match the center-of-mass of the two vehicles. Such has the advantage of reducing fuel costs, while, since the two vehicles are not linked, not feeding vibrations from one to the other. The challenges here are the vibrations induced by the tether and counterweight and the collision avoidance needed between the tether and the untethered vehicle.

Figure 8:
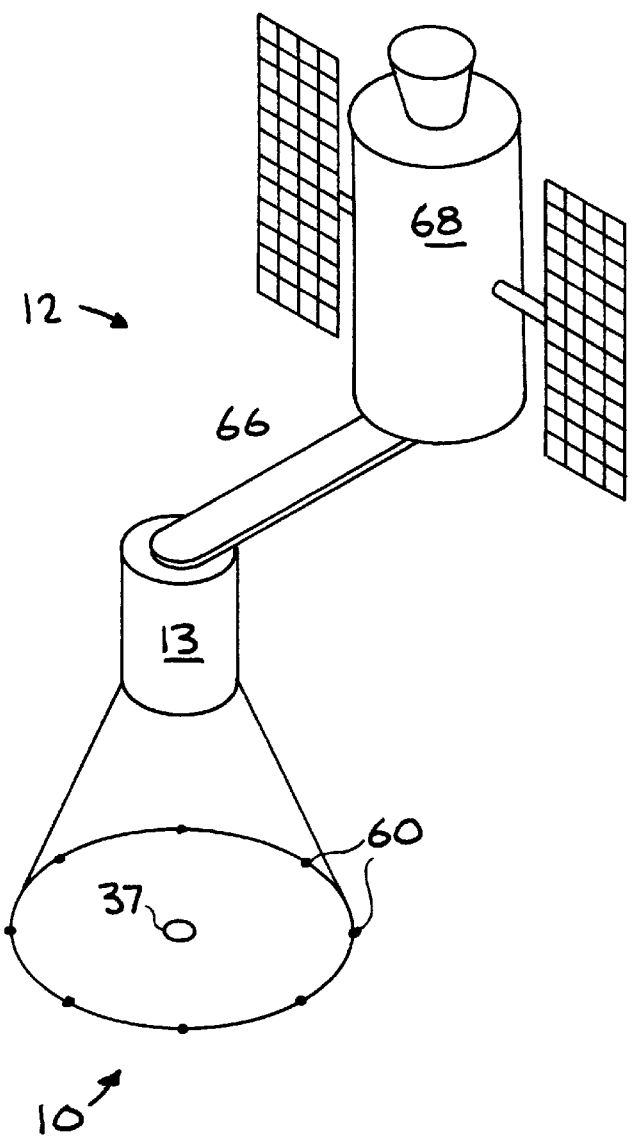
FIG. 8 illustrates the preferred embodiment for the eyepiece vehicle wherein the optics of the eyepiece is supported by a movable arm which connects to the main body of the spacecraft.
Figure 9:
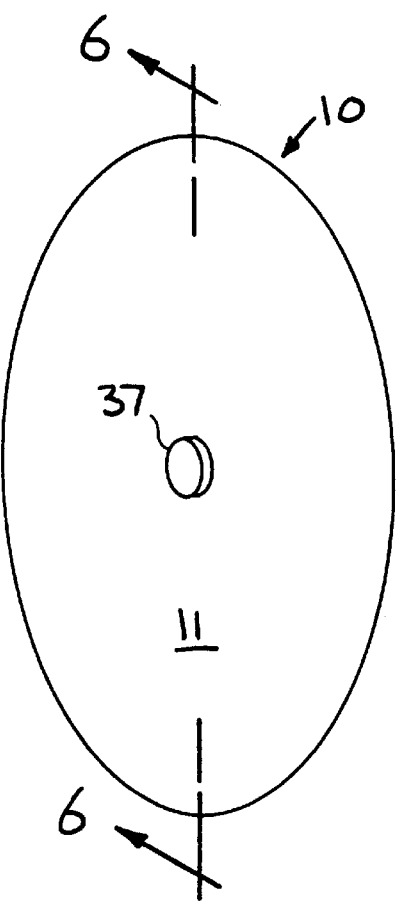
FIG. 9 is a drawing of the preferred objective lens illustrating the center core-mounted gyro-wheel and the large Fresnel membrane.

If frequent changes in the viewing-direction are desired, the fuel costs associated with moving the eyepiece 12 along the focal surface of the objective lens 10 can become significant. The eyepiece 12 can be (and is in the preferred embodiment) designed to use internal-mass-shifting rather than propulsive center-of-mass-translation for some of these target changes; this reduces fuel costs. In the current design, internal-mass-shifting is performed by connecting the eyepiece optical-system to its (much more massive) spacecraft bus 68 via a moveable arm 66 as shown in FIG. 8. Targets near the inter-vehicular axis can then be imaged without fuel use, using the arm 66 to properly position the eyepiece optical system 13. Other alternative embodiments, using for instance deployable trusses or cables, could extend the target-range accessible by internal-mass-shifting, thereby further reducing fuel requirements.

The nominal implementation of the eyeglass images a visible-light spectral band having a bandwidth, $\Delta\lambda/\lambda$, of less 20%. The existence of a bandwidth limit is fundamental to the eyeglass concept, but its particular value is not (being set by the size of eyepiece vehicle that can be affordably orbited). Several alternative embodiments of the present inventions can be employed, having different spectral-band locations and widths. The eyeglass can be designed to operate in any, similarly wide, spectral band for which its optical elements are transparent. For a polymer-based objective lens 10, wavelength regions from the near-UV through the thermal-infrared are potentially accessible, although each different choice of polymer will suffer particular spectral regions of self-absorption blockages.

Wider-band spectral coverage can be achieved in several ways. One approach is to use multiple eyepiece vehicles 12. Each operates in a different standoff spectral band and hence at a different distance from the objective lens vehicle 10. These can view either the same or different targets 16. Another approach is for the eyepiece 12 optics to be designed allowing a single eyepiece 12 to operate at several different spectral bands. When using a single spectral-band objective lens, such viewing is non-simultaneous, as the eyepiece 12 must increase or decrease its standoff distance from the objective lens to access the different spectral bands. The eyepiece 12 optics must be adjusted to maintain diffraction-limited achromatic viewing at the different separations. This is done either by a continuous zoom-optics process, or by having fully-or-partially separate optical chains for a discrete set of different spectral bands. The challenge for a zoom optics approach is to properly correct aberrations at the different vehicle separations. A third approach is to use multi-frequency objective lens designs (as were discussed earlier) with a single eyepiece 12 to simultaneously view several different spectral bands.

The objective lens described herein can be used as a large aperture for other space optics which utilize single color light such as lasers. Two such applications are antennas for optical communications and/or for power transmission.

What is claimed is:

1. A space telescope, comprising:
    an objective lens which includes a large aperture diffractive lens for providing magnification and focusing of light coming from an object of interest;
    an eyepiece for sensing and processing the light received from said diffractive lens, said objective lens and said eyepiece being in separate spacecraft vehicles; and
    means for aligning and positioning said spacecraft vehicles which includes;
        a counter-rotating gyro-wheel mounted within said objective lens,
        low thrust electrical rockets attached to said eyepiece, and
        an interferometric system for determining relative position between the two spacecraft so that said vehicles may be maneuvered and maintained at a standoff focal distance.

2. The telescope of claim 1, wherein the objective lens is a Fresnel lens.

3. The telescope of claim 2, wherein the eyepiece includes an inverse Fresnel lens.

4. The telescope of claim 2 wherein the Fresnel lens comprises a flexible membrane material.

5. The telescope of claim 4, wherein said flexible membrane is supported by a circumferential compression-loaded rim comprising a spoke-truss and suspension cable system.

6. The telescope of claim 4, wherein said flexible membrane is supported by a circumferential rim which is tension loaded by either a deployable truss system, internal gas pressurization or in-space rigidized foam.

7. The telescope of claim 4, wherein said flexible membrane is supported by a circumferential rim which has a current loop force applied to it utilizing superconductors for electrical power.

8. The telescope of claim 4, further comprising heating elements to provide uniform heating throughout said membrane material.

9. The telescope of claim 2, wherein the Fresnel lens further comprises a simultaneous combination of a multi-harmonic phase plate and a spectrally-specific zone-plate design to provide the transmittance of both visible-to-near-infrared (IR) region and the mid-IR or thermal-IR region.

10. The telescope of claim 2 wherein the Fresnel lens further comprises a zone-plate design.

11. The telescope of claim 2 wherein the Fresnel lens further comprises a phase-plate design.

12. The telescope of claim 2 wherein the Fresnel lens further comprises a sequence of zone plates placed atop one another.

13. The telescope of claim 12, wherein the Fresnel lens further comprises a multi frequency membrane formed with stacked-up zone plate coatings each of which operate on a separate spectral-band and are transparent to all other bands.

14. The telescope of claim 2, wherein said objective lens further includes solar panels to provide electrical power.

15. The telescope of claim 2, wherein the eyepiece spacecraft comprises: a transfer optical system for correcting chromatic distortions in object light received from said Fresnel lens.

16. The telescope of claim 15 wherein said transfer optical system further comprises:
    a primary mirror and a secondary mirror, both said mirrors having aspheric comic surface profiles; and,
    an inverse Fresnel lens for correcting chromatic distortions received from said Fresnel lens.

17. The telescope of claim 15 wherein the eyepiece further comprises:
    an adaptive optics system for correcting wavefront distortions in object light received from said transfer optical system.

18. The telescope of claim 17 wherein said adaptive optics system comprises:
    a deformable mirror;
    a wavefront sensor to detect optical aberrations; and,
    electronic circuitry to compute correction and apply it to said deformable mirror.

19. The telescope of claim 15, wherein said separate eyepiece spacecraft is comprised of a plurality of eyepiece vehicles each of which are at different standoff distances behind the objective lens.

20. The telescope of claim 15 wherein said optical system is located in an enclosure which is connected to the eyepiece spacecraft's bus via a movable arm.

21. The telescope of claim 15 wherein said objective lens spacecraft and said eyepiece spacecraft are connected via a tether.

22. The telescope of claim 15 wherein said object of interest may be either earth bound or celestial.

23. The telescope of claim 15, wherein the eyepiece further comprises: an adaptive optics system which includes a small aperture deformable mirror designed to improve the viewing theater of the eyepiece and two flat turning mirrors designed to keep the light received from said transfer optical system fixed onto a sensor array during exposures.

24. A space telescope of claim 1, wherein said counter-rotating gyro-wheel is axially oriented in an encasement which is centrally mounted at the core of said objective lens.

25. A space telescope of claim 24, wherein said encasement is angularly offset to the plane of said objective lens and gyro-wheel.

26. A space telescope of claim 25, wherein the torque causing the angular off-set of said encasement is generated either by physical tilting of the rain gyro-wheel or by activation of smaller transverse control g-wheels also housed therein.

27. The telescope of claim 1, wherein said means for aligning and positioning further comprises a tether attached either to one or between said objective lens and said eyepiece vehicles.

28. A space telescope of claim 1, wherein said interferometric system comprises:
    a beacon to signal the eyepiece of its position relative to said objective lens; and
    reflectors to signal the eyepiece of its distance to said objective lens.

29. A space telescope of claim 28, wherein said interferometric system further comprises:
    electronics, lasers or radar and sensors mounted on the eyepiece vehicle; and
    passive comer cube reflectors mounted on the objective lens vehicle.

* * * * *